United States Patent [19]

Forgione

[11] 3,847,743

[45] Nov. 12, 1974

[54] ENZYMES BOUND TO CARBONYL POLYMERS

[75] Inventor: Peter Salvatore Forgione, Stamford, Conn.

[73] Assignee: American Cyanamid Company, Stamford, Conn.

[22] Filed: Jan. 12, 1973

[21] Appl. No.: 323,001

Related U.S. Application Data

[62] Division of Ser. No. 174,549, Aug. 24, 1971, Pat. No. 3,770,700.

[52] U.S. Cl............... 195/63, 195/68, 195/DIG. 11
[51] Int. Cl............................................. C07g 7/02
[58] Field of Search................ 195/63, 68, DIG. 11; 260/73 R, 670 A

[56] References Cited

UNITED STATES PATENTS

| | | | |
|---|---|---|---|
| 3,753,861 | 8/1973 | Forgione | 195/DIG. 11 X |
| 3,770,700 | 11/1973 | Forgione | 195/63 X |
| 3,730,841 | 5/1973 | Forgione et al. | 195/63 |
| 3,658,745 | 4/1972 | Merrill et al. | 260/73 R X |
| 3,705,084 | 12/1972 | Reynolds | 195/68 X |

*Primary Examiner*—David M. Naff
*Attorney, Agent, or Firm*—Frank M. Van Riet

[57] ABSTRACT

Enzymes are covalently bound to sulfited aldehyde or ketone polymers cross-linked with dialdehydes.

10 Claims, No Drawings

ENZYMES BOUND TO CARBONYL POLYMERS

CROSS-REFERENCE TO RELATED APPLICATION

This application is a division of our copending application Ser. No. 174,549 filed Aug. 24, 1971 and now U.S. Pat. No. 3,770,700.

BACKGROUND OF THE INVENTION

The binding of enzymes to suitable carriers in order to insolubilize said enzymes and thereby render them repeatedly or continuously useful for the conversion of enzymatically convertible substrates has been of interest in recent years. Specifically, Silman et al., Water-Insoluble Derivatives of Enzymes, Antigens and Antibodies, Annual Review of Biochemistry, Vol. 35, Part II, P. D. Boyer, Editor; Annual Review Inc., Palo Alto, Calif.; pages 873-908; 1966 discuss many methods for binding enzymes to carriers, including adsorption, inclusion inside the lattice of the carrier, covalent binding and covalent cross-linking.

Additionally, my abandoned application, Ser. No. 8,089, filed Feb. 2, 1970 and entitled Products, discloses and claims a novel group of polymer bound, catalytically active enzymes, over which this invention is an improvement. Said application is hereby incorporated herein by reference.

SUMMARY

I have now found that a greater quantity of enzyme can be covalently bound to carbonyl polymers, such as aldehyde and ketone polymers, if the carbonyl polymer is cross-linked, i.e., rendered insoluble, with a dialdehyde rather than other known cross-linking agents since the number of aldehyde groups available for enzyme binding is not thereby decreased. That is to say, reacting the carbonyl polymer with the dialdehyde via an aldol condensation reaction, does not cause a decrease in the aldehyde groups, through which cross-linking occurs, available in the carbonyl polymer as results with the use of other cross-linkers because the aldehyde groups of the dialdehyde cross-linking agent either replace or add to those of the carbonyl polymer taken up in the cross-linking reaction or otherwise stabilize the total number of aldehyde groups present. As a result, the polymer becomes cross-linked and the number of available aldehyde groups on the cross-linked polymer remains substantially constant thereby enabling more enzyme to be bound thereto.

DESCRIPTION OF THE INVENTION INCLUDING PREFERRED EMBODIMENTS

The compositions of my invention, as mentioned briefly above, comprise carbonyl polymers which are cross-linked with dialdehydes having the formula

wherein R is a $(CH_2)_x$ group, $x$ being 0–18, inclusive, a cyclic alkylene group of 4–10 carbon atoms, inclusive, or an arylene group of 6–12 carbon atoms, inclusive.

The cross-linking reaction is an aldol condensation type of reaction and occurs between the reactive groups of the carbonyl polymer and the α-carbon atom of the dialdehyde. The reaction is carried out under typical aldol reaction conditions such as set forth in The Aldol Condensation, Nielsen et al, Organic Reactions, Vol. 16, pages 1–85, John Wiley and Sons, N.Y., 1968. In general, the reaction is conducted at a temperature ranging from about 0°–80° C. The reaction media is maintained in an alkaline condition, i.e., at a pH of over 7.0 by the addition of suitable well known materials such, for example, as sodium hydroxide in ethanol, calcium or barium hydroxide, magnesium hydroxide, aluminum hydroxide; primary or secondary amines such as pyrrolidone, morpholine, piperidine, diethyl amine; acids such as acetic acid, sulfuric acid; salts such as sodium carbonate, sodium phosphate, pyrrolidinium and piperidinium acetates and the like, thereto.

The cross-linked polymer formed according to this process is insoluble and therefore precipitates from solution. Recovery of the polymer can be effected by filtration, centrifugation, etc. The cross-linked polymers of my invention are preferably prepared for the subsequent binding of catalytically active enzymes thereto. To this end, the carbonyl polymer must generally be first rendered susceptible to reaction with the enzyme which will be subsequently bound thereto. This is accomplished, in the case of most aldehyde polymers, by reaction of the polymer with a suitable solubilizing agent such as a bisulfite, specifically an alkali metal or alkaline earth metal bisulfite such as sodium, potassium, calcium, etc. bisulfite. The reaction is conducted at a temperature ranging from about 25° C. to about 90° C., at atmospheric pressure, although superatmospheric or sub-atmospheric pressure can be utilized if desired, the process being more specifically disclosed in U.S. Pat. No. 2,657,192, hereby incorporated herein by reference.

After the bisulfite treatment, the aldehyde polymers are then made hydrophilic by cross-linking as discussed above. By the term "hydrophilic," as used herein, is meant that the polymer is wettable or swellable in water but is not substantially soluble therein. The compositions can contain hydrophobic members or portions provided that they also have hydrophilic portions which function as such when in contact with water.

If desired, the cross-linking step may be accomplished first and the bisulfite reaction second when the cross-linked polymer is to be used to bind an enzyme thereto, the only criteria being that the resultant product is in such a state so as to allow reaction thereof with the enzyme.

The enzyme is reacted with the hydrophilic polymer at a temperature below that at which it, the enzyme, is deactivated. The temperatures at which specific enzymes are deactivated are well known to those skilled in the art and therefore need not be enumerated herein. Suffice it to say that generally temperatures below about 75° C., preferably from about 5° C. to about 65° C. should be used. The reaction is preferably carried out in the presence of buffers to control the pH of the reaction mixture at a desired level and with agitation, the particular pH being governed by the particular enzyme being bound, according to to known techniques.

In regard to ketone polymers, the same procedure specified above in regard to the aldehyde polymers may be utilized the result being a cross-linked ketone polymer. When utilizing the ketone polymers as carriers for enzymes, if the polymers themselves are not sufficiently hydrophilic to enable them to be reacted with the enzyme, the same solubilizing techniques may also be used. That is to say, some ketone polymers, as with the aldehyde polymers, are not per se water-soluble and since most enzymes are denatured by organic solvents and therefore any reaction therewith must be carried out in an aqueous medium, the ketone polymers must also be rendered hydrophilic before contact with the enzyme. Reactions of this general type are shown in U.S. Pat. No. 3,271,334, also hereby incorporated herein by reference.

When the aldehyde or ketone polymer is per se water-soluble, the bisulfite reaction need not be conducted and the enzyme can be contacted with the polymer immediately after rendering it insoluble, by cross-linking with the dialdehyde as discussed above. The basic requirement when enzyme binding is to be accomplished, is that the final enzyme-polymer adduct must be hydrophilic in order that it may be utilized in the enzymatic conversion of substrates to their conversion products.

For example, in a specific embodiment, polyacrolein, a water-insoluble polymer, must be first contacted with a bisulfite such as sodium bisulfite in order to render it water-soluble. In such a condition, however, the polymer cannot be reacted with an enzyme because recovery of any product thereof is relatively impossible. Cross-linking of the bisulfite-polymer product with a dialdehyde, however, renders it gel-like in consistency and effectively hydrophilic so as to allow reaction with the enzyme. The result of these two reactions is that the bisulfite breaks some of the heterocyclic rings of the polyacrolein creating more enzyme-reactive aldehyde groups thereon, in addition to a series of bisulfite groups. The dialdehyde reacts with some of these aldehyde and bisulfite groups with the formation of

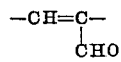

linkages between two polymer molecules, thereby cross-linking the polyacrolein. Reaction of the enzyme, e.g. invertase, forms an adduct or covalent bond between the enzyme, the aldehyde groups of the cross-linking linkages and the other available aldehyde groups, and also through the bisulfite groups.

Examples of carbonyl polymers which may be utilized herein include those produced according to any known procedure from such aldehyde monomers as acrolein; α-alkyl acroleins e.g. methacrolein, α-propylacrolein; crotonaldehyde; 2-methyl-2-butenal; 2,3-dimethyl-2-butenal; 2-ethyl-2-hexenal; 2-decenal; 2-dodecenal; 2-methyl-2-pentenal; 2-tetradecenal and the like, alone or in admixture with up to 95 percent, by weight, based on the total weight of the copolymer, of each other and/or such other copolymerizable monomers known to react therewith such as unsaturated alcohol esters, e.g. the allyl, crotyl, vinyl, butenyl etc. esters of saturated and unsaturated aliphatic and aromatic monobasic and polybasic acids such as acetic, propionic, butyric, valeric, adipic, maleic, fumaric, benzoic, phthalic, terephthalic etc. acids; vinyl cyclic compounds (including monovinyl aromatic hydrocarbons) e.g. styrene, o-, m-, and p-chlorostyrenes, -bromostyrenes, -fluorostyrenes, -methylstyrenes, -ethylstyrenes, various polysubstituted styrenes, e.g. di-, tri-, and tetra-chlorostyrenes, -bromostyrenes etc.; vinyl naphthalene, vinyl chloride, divinyl benzene, allyl benzene, vinyl pyridine, diallyl benzene; various α-substituted and α-substituted, ring-substituted styrenes e.g. α-methyl styrene, α-methyl-p-methyl styrene, etc.; unsaturated ethers, e.g. ethylvinylether, etc.; unsaturated amides e.g. acrylamide, methacrylamide etc.; N-substituted acrylamides e.g. N-methylolacrylamide, N-allyl acrylamide, N-methyl acrylamide, etc.; acrylates such as the methyl, ethyl, propyl, butyl etc. acrylates and methacrylates; nitriles such as acrylonitrile and other comonomers shown, for example, in U.S. Pat. No. 2,657,192 mentioned hereinabove. Similarly, such polymers as the copolymers of ethylene and carbon monoxide and various glyoxal adducts, all well known in the art, can be utilized herein. Examples of other carbonyl polymers which may be utilized include those produced according to any known procedure and in amounts similar to those indicated above in regard to the aldehyde polymers from such ketone monomers as methyl vinyl ketone, methyl allyl ketone, ethyl vinyl ketone, methyl isopropenyl ketone, ethyl allyl ketone, etc. phenyl vinyl ketone, p-tolyvinyl ketone. Also, I may use such polymers as poly(vinyl-pyridinium ketones) and haloketones; copolymers of the above-mentioned aldehyde monomers and ketone monomers with or without the above-disclosed copolymerizable comonomers; polyacetal and the like. The molecular weight of the polymers used is not critical and polymers having molecular weights as low as 1,000 can therefore be used. In regard to the dialdehydes useful herein, such materials as malonaldehyde, succinaldehyde, glutaraldehyde, adipaldehyde, pimelaldehyde, suberaldehyde, azelaldehyde, sebacaldehyde, octadecanedial, glyoxal, 1,2 -or 1,3-cyclobutanedicarboxaldehyde, 1,2-or 1,3-cyclobutanediacetaldehyde, 1,2-or 1,3-cyclopentanedicarboxaldehyde, 1,2-or 1,3-cyclopentanediacetaldehyde, 1,2-,1,3-or 1,4-cyclohexanediacetaldehyde, 1,2-,1,3-or 1,4-cyclohexanedicarboxaldehyde, 1,2-, 1,3-or 1,4-cyclohexptanediacetaldehyde, 1,2-, 1,3-, 1,4-or 1,5-cyclooctandediacetaldehyde, isophthalaldehyde, terephthalaldehyde, phthalaldehyde, o-benzenediacetaldehyde, m-benzenediacetaldehyde, p-benezenediacetaldehyde, 1,5-naphthalenedicarboxaldehyde, 1,2-naphthalenediacetaldehyde and the like, may be used with branched chain, etc. dialdehydes also proving successful.

Exemplary of the enzymes which may be utilized to produce my novel bound materials include proteolytic enzymes, hydrolases, amylases, dehydrogenases, kinases, oxidases, deaminases, amidases, antigens, antibodies etc. including lactic dehydrogenase, creatine, phosphokinase, trypsin, papain, ribonuclease, alk. phosphatase, amyloglucosidase, dextranase, glucose oxidase, amidase, penicillin amidase, chymotrypsin, β-galactosidase, pyruvate kinase, ficin, pepsin, carboxypeptidase, streptokinase, plasminogen, urease, amylase, invertase, alcohol dehydrogenase diastase, β-glycosidase, maltase, glucose isomerase lactase, amygdalase, lipase, steapsin, erepsin, rennin, zymase, catalase, melibiase, pectolase, protease, tyrosinase, cytase, cellulase, adenase, guanidase, carboxylase, inulase, bovine erythricyte, and horse serum cholinesterase, vinegar oxidase, pectinase, aldehydase, rhamnase, myrosinase, phytase, tannase, carbamase, nuclease, guanase, adenase, thrombase, chymase, cozymase and the like.

As mentioned briefly above, the cross-linked products of my invention find utility in the preparation of bound enzyme products which, in turn, may be used in the conversion of enzymatically convertible substrates to their conversion products. More specifically, the enzymes are known to function catalytically in nature to convert various materials, known to those skilled in the art as substrates, to other materials. For example, lipase converts fat to glycerol and fatty acid, invertase converts sucrose to invert sugar, lactase acts upon lactose, etc.

The polymer bound enzyme products, being water-insoluble, enable the substrate to be converted while in aqueous solution, while still retaining the catalytic activity of the enzyme. Thus, for example, an aqueous solution of sucrose can be continually contacted with polymer bound invertase to convert the sucrose to invert sugar. The catalytic activity of the invertase remains high for a long period of time. By "catalytically active" or "active catalytic activity," as utilized herein, is meant the ability or availability of the bound enzyme to convert a particular substrate to its conversion product.

The following examples are set forth for purposes of illustration only and are not to be construed as limitations on the present invention except as set forth in the appended claims. All parts and percentages are by weight unless otherwise specified.

EXAMPLE 1

4.0 Parts of a 20 percent glutaraldehyde solution are slowly added with stirring to 40 parts of a 10 percent solution of polyacrolein-sodium bisulfite adduct (m.w. 80,000) previously adjusted to pH 10 with 10 percent sodium hydroxide solution. The mixture is stirred at 23° C. for 1 hour and the off-white hydrophilic product which forms is then filtered and washed to neutrality.

The wet hydrophilic adduct thus obtained is suspended in 50 parts of water and reacted with 0.104 part of invertase (twice recrystallized) which has been first dissolved in 4 parts of water. The enzyme reaction mixture (pH 6.5) is gently stirred for 18 hours at 10°C. and the resulting hydrophilic covalently bound enzyme polymer adduct is then washed free of unreacted enzyme. Assay of the hydrophilic enzyme-polymer adduct shows high activity with sucrose solution, in that 4 percent, by weight, of the isolated wet cake converts 100 ml. of a 10 percent sucrose solution at pH 4.8 to 83.0 percent invert sugar in 15 minutes at 42° C.

The assay procedures (polarimetric) used are based on H. U. Bergmeyer's Methods of Enzymatic Analysis, Academic Press, New York (1963), pp. 902-3.

EXAMPLE 2

5 Parts of a copolymer of acrolein-sytrene (93.8:6.2 weight ratio, respectively) are suspended in 40 parts of water containing 4.3 parts of sodium metabisulfite at pH 5.7. The mixture is stirred over nitrogen at 65° C. for 5 hours, resulting in a completely water-soluble product. To this bisulfite addition product is slowly added, with stirring, 4.0 parts of a 20 percent solution of adipaldehyde and the pH of the reaction mixture adjusted to pH 10.5 with 10 percent sodium hydroxide solution. The reaction mixture is stirred at 20°C. for 2 hours. The resultant cross-linked, hydrophilic copolymer is filtered, washed to neutral pH, suspended in 20 parts of water and reacted with 4 ml. of technical grade ($k = .6$) invertase at 18° C. for 15 hours. The resulting covalently bound enzyme polymer adduct is washed free of unbound enzyme with distilled water and filtered (8.4 parts wet). Assay of 10 percent, by weight, of the wet product of with 100 ml. of 10 percent sucrose solution (same experimental conditions as above) results in a 46.0 percent conversion to invert sugar.

EXAMPLE 3

10 Parts of a copolymer of acrolein-acrylonitrile (93.1:6.9 weight ratio, respectively) are suspended in 82 parts of water containing 8.6 parts of sodium metabisulfite at pH 5.6. The mixture is stirred at 60°–70° C. over a nitrogen atmosphere until solubilized. 22 Parts of the above bisulfite addition product are then reacted with 4.0 parts of a 20 percent glutaraldehyde solution containing 3 parts of pyrrolidine and 2.5 parts of acetic acid at 23° C. for 4 hours. The resultant cross-linked, hydrophilic copolymer is filtered and continuously washed until the washings are neutral. The gel-like residue is suspended in 25 parts of water and reacted with 4 ml. of technical grade ($k = 0.6$) invertase solution at 15° C. for 16 hours with stirring. The covalently bound invertase-polymer adduct is repeatedly washed with distilled water until free of unbound enzyme (total weight of wet product after filtration: 14.2 parts). Assay of 10 percent, by weight, of the adduct with 100 ml. of 10 percent sucrose, using the same experimental conditions set forth in Example 1, results in a 81.2 percent conversion to invert sugar.

EXAMPLE 4

10 Parts of a copolymer of acrolein-acrylic acid (85:15 weight ratio, respectively) are suspended in 81 parts of water containing 8.6 parts of sodium metabisulfite at pH 5.6 and heated for 24 hours at 75° C. over a nitrogen atmosphere. To 22 parts of the resulting soluble bisulfite addition product is slowly added 2.0 parts of 1,2-cyclohexanediacetaldehyde in 10 parts of water. The reaction mixture (pH 10.3 with NaOH) is stirred at 25° C. for 2 hours and the hydrophilic product that forms is filtered and washed with water to neutral pH. The resultant solid is suspended in 80.0 parts of water and reacted with 3 ml. of technical grade invertase ($k = .6$) at 10° C. for 17 hours. The resulting covalently bound enzyme adduct is washed free of unbound invertase with distilled water and filtered (29.2 parts wet). Assay of 5 percent, by weight, of the wet product with 100 ml. of 10 percent sucrose solution (same experimental conditions as Example 1) results in a 51.2 percent conversion to invert sugar.

EXAMPLE 5

15 Parts of polymethacrolein are treated with 100 parts of water containing 11 parts of sodium metabisulfite at pH 5.7 at 65° C. for 20 hours over a nitrogen atmosphere. The resulting bisulfite adduct is then treated with 5.0 parts of suberaldehyde in 20 parts of water for 1.5 hours at 22° C. at pH 10.6 adjusted with sodium hydroxide. The resultant hydrophilic cross-linked polymer is then washed to neutral pH with water and filtered. The wet cake is suspended in 100 parts of water and reacted with 6 ml. of technical grade invertase ($k = 0.6$) at 16° C. for 18 hours. The resulting covalently bound enzyme is washed free of unbound invertase with distilled water and filtered. Assay of 5 percent, by weight, of the wet cake with 100 ml. of a 10 percent sucrose solution (see above experimental data — Example 1) results in a 58.0 percent conversion to invert sugar.

EXAMPLE 6

The procedure of Example 5 is again followed except that a methacrolein-styrene (50:50) copolymer (U.S. Pat. No. 2,945,006) is substituted for the polymer used therein and the dialdehyde is octadecanedial. Subsequent adduct formation, cross-linking and washing results in an invertase bound polymer system which effects a 70.0 percent conversion of sucrose to invert sugar.

EXAMPLE 7

10 Parts of poly(methylvinyl ketone) are treated with 80 parts of water containing 8 parts of sodium bisulfite at pH 5.8 at 65° C. for 18 hours over a nitrogen atmosphere. The resulting bisulfite adduct is then treated with 7.0 parts of a 20 percent solution of p-benzenediacetaldehyde dissolved in 16 parts of water, with stirring, for 1.5 hours at 15° C. and pH 11.0. The hydrophilic polymer is then washed to neutral pH and filtered. The wet cake is suspended in 55 parts of water and reacted with 4 ml. of technical grade invertase ($k = .6$) at 18° C. for 16 hours. The resulting covalently bound enzyme polymer adduct is washed free of unbound invertase with distilled water and filtered (22.0 g. wet). Assay of 10 percent, by weight, of the wet product with 100 ml. of 10 percent sucrosesolution (see Example 1) results in a 46.0 percent conversion to invert sugar.

Following the procedures of Example 1 or Example 7 except that various copolymers, other homopolymers and dialdehydes are substituted for the polymers utilized therein, bound invertase compositions are prepared and utilized to convert sugar solutions to invert sugar. The results are set forth in Table I, below.

TABLE I

| Ex. | Carbonyl Polymer | % Conversion To Invert Sugar |
| --- | --- | --- |
| 8 | Acrolein-ethyl acrylate-styrene (25/20/55) with succinaldehyde | 61% |
| 9 | Acrolein-methylvinyl ketone (45/55) (m.w. 1400) with sebacaldehyde | 74% |
| 10 | Acrolein-vinyl acetate (60/40) with 1,2-cyclobutanediacetaldehyde | 68% |
| 11 | α-methyl acrolein-methyl methacrylate (50/50) with 1,2-cyclobutanedicarboxaldehyde | 47% |
| 12 | Acrolein-allyl glycolate (80/20) with 1,5-cyclooctanediacetaldehyde | 84% |
| 13 | Poly(isopropenylmethyl ketone) with azelaldehyde | 58% |

TABLE I—Continued

| Ex. | Carbonyl Polymer | % Conversion To Invert Sugar |
| --- | --- | --- |
| 14 | Acrolein-glycidyl methacrylate (40/60) with 1,2-naphthalenediacetaldehyde | 41% |
| 15 | Methylvinyl ketone-methyl methacrylate (70/30) with malonaldehyde | 61% |
| 16 | Methylvinyl ketone-vinyl acetate (5/95) with glyoxal | 50% |

EXAMPLE 17

10 Parts of wet (~10% solids) cross-linked polyacrolein-sodium bisulfite addition complex (as prepared in Example 1) are suspended in 40 parts of water at pH 7.0 and reacted with 0.110 part of crystalline trypsin, dissolved in 4 parts of water. The reaction mixture is stirred for 18 hours at 10° C. and at the end of this time the resulting covalently bound trypsin adduct is washed until free of unbound enzyme. Analysis of the washings at 280 mμ indicates that 81.3 percent of the enzyme is bound to the polymer. The wet polymer enzyme cake is freeze dried, resulting in a product having .091 part trypsin per part of solids. The product, on assay, affords 18.4 units of activity per mg. of enzyme (native enzyme 66 units/mg.), therefore possessing 28.0 percent of the original activity. The analytical procedure used is the standard pH stat method (pH 7.9) using benzoyl arginine ethyl ester (BAEE) substrate.

EXAMPLE 18

2.5 Parts of poly(isopropenylmethyl ketone) are stirred with 25 parts of water containing 2.1 parts of potassium metabisulfite at pH 5.8 for 16 hours at 75° C. over a nitrogen atmosphere. At the end of this time, 1.5 parts of a 20 percent phthalaldehyde solution are added to the above reaction mixture and stirred at 25° C. for 1 hour. The hydrophilic adduct which results is washed to neutral pH and filtered. The wet cake is suspended in 30 parts of water and reacted with .025 part of glucose oxidase dissolved in 2 parts of water at 10° C. for 18 hours. The resultant covalently bound enzyme is washed free of unbound glucose oxidase with cold distilled water and filtered. Assay of 0.5 percent of the total wet cake using the standard pH stat procedure (pH 6.3) (substrate: 50 ml. of 1 percent glucose solution with excess oxygen) in which the liberated gluconic acid is titrated with standard. .01N NAOH indicates that the activity of the adduct is 18.6 units/mg.-/min.(native glucose oxidase assays 20.5 units/mg./-min.).

Following the techniques of the previous examples, various other enzymes are covalently bound to the cross-linked polymeric materials disclosed therein to produce a hydrophilic composition. The results are set forth in Table II, below.

TABLE II

| EXAMPLE | EXAMPLE PROCEDURE FOLLOWED | ENZYME BOUND | RESULTS |
| --- | --- | --- | --- |
| 19 | Example 2 | glucose isomerase | Converts glucose to fructose |
| 20 | Example 9 | α-amylase | Continuously hydrolyzes polysaccharides to glucose and maltose |

TABLE II – Continued

| EXAMPLE | EXAMPLE PROCEDURE FOLLOWED | ENZYME BOUND | RESULTS |
|---|---|---|---|
| 21 | Example 18 | tyrosinase | Tyrosine converted continuously to dihydroxyphenylalanine |
| 22 | Example 17 | pectinase | Acts on pectin continuously to pectic acid |
| 23 | Example 17 | glucoamylase | Converts polysaccharides to glucose |

EXAMPLE 24

The procedure of Example 18 is again followed except that no sodium metabisulfite is utilized. When the recovered polymer is used in the conversion of sucrose to invert sugar, similar results are observed.

I claim:

1. A cross-linked polymer consisting essentially of the reaction product of (1) a sulfited aldehyde or ketone polymer produced from a vinyl monomer and (2) a dialdehyde having the formula

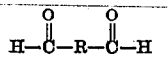

wherein R is a $(CH_2)_x$ radical, $x$ being 0–18, inclusive, an unsubstituted cyclic aliphatic group of 4–10 carbon atoms, inclusive, or an unsubstituted arylene group of 6–12 carbon atoms, inclusive, having a catalytically active enzyme covalently bound thereto.

2. A composition according to claim 1 wherein $x$ is 3.

3. A composition according to claim 1 wherein said carbonyl polymer is polyacrolein.

4. A composition according to claim 1 wherein R is a phenylene group.

5. A composition according to claim 1 wherein said carbonyl polymer is a polyacrolein-bisulfite adduct.

6. A method which consists essentially of cross-linking (A) a sulfited aldehyde or ketone polymer produced from a vinyl monomer with (B) a dialdehyde having the formula

wherein R is a $(CH_2)_x$ radical, $x$ being 0–18, inclusive, an unsubstituted cyclic aliphatic group of 4–10 carbon atoms, inclusive, or an unsubstituted arylene group of 6–12 carbon atoms, inclusive, under alkaline conditions, recovering the resultant polymer and covalently binding a catalytically active enzyme to the recovered polymer.

7. A method according to claim 6 wherein $x$ is 3.

8. A method according to claim 6 wherein said carbonyl polymer is polyacrolein.

9. A method according to claim 6 wherein said carbonyl polymer is a polyacrolein-bisulfite adduct.

10. A method according to claim 6 wherein R is a phenylene group.

* * * * *